US007129481B2

(12) United States Patent
Overney

(10) Patent No.: US 7,129,481 B2
(45) Date of Patent: Oct. 31, 2006

(54) MASS SPECTROMETER WITH FLEXIBLE USER INTERFACE

(75) Inventor: Gregor Overney, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 268 days.

(21) Appl. No.: 10/457,597

(22) Filed: Jun. 9, 2003

(65) Prior Publication Data

US 2004/0245992 A1 Dec. 9, 2004

(51) Int. Cl.
*B01D 59/44* (2006.01)

(52) U.S. Cl. ........................ 250/288; 250/288; 250/281

(58) Field of Classification Search ................ 250/281, 250/282, 288
See application file for complete search history.

(56) References Cited

U.S. PATENT DOCUMENTS

| | | | | |
|---|---|---|---|---|
| 5,525,799 | A * | 6/1996 | Andresen et al. | 250/288 |
| 5,692,400 | A * | 12/1997 | Bliven et al. | 70/58 |
| 6,611,849 | B1 * | 8/2003 | Raff et al. | 707/203 |
| 6,782,337 | B1 * | 8/2004 | Wack et al. | 702/155 |
| 6,822,223 | B1 * | 11/2004 | Davis | 250/282 |

* cited by examiner

*Primary Examiner*—Jack Berman
*Assistant Examiner*—Jennifer Yantorno

(57) ABSTRACT

A mass spectrometer that includes a tray on the outer housing of the mass spectrometer for receiving a portable user interface. Each of the user interface and the tray has a transceiver port for transmitting and receiving electromagnetic wave radiation as infrared radiation. More specifically, the tray also includes a serial port connector and the portable user interface includes a receptor for receiving the serial port connected when the user interface is mounted on the tray.

13 Claims, 2 Drawing Sheets

MASS SPECTROMETER WITH FLEXIBLE USER INTERFACE

CROSS-REFERENCE TO RELATED APPLICATIONS NOT APPLICABLE

STATEMENT REGARDING FEDERALLY SPONSORED RESEARCH OR DEVELOPMENT

This invention has been created without the sponsorship or funding of any federally sponsored research or development program.

TECHNICAL FIELD

This invention relates generally to mass spectrometry (MS) and particularly to a mass spectrometer operating with a flexible user interface.

BACKGROUND OF THE INVENTION

A mass spectrometer is an analytical instrument for determining the molecular weight of chemical compounds by separating molecular ions in accordance with their mass-to-charge ration (m/z). The mass spectrometer includes an ionization source, an ion mass filter/analyzer and an ion detector.

A sample to be ionized is introduced to the ionization source which generates ions by inducing either the loss or gain of a charge. This can be accomplished, for example, by electron ionization, fast atom bombardment, laser description and electrospray. The mass filter/analyzer separates the ions according to their mass-to-charge ration m/z. The ion is delivered to the detector which produces a signal. The detector signal is then transferred to a computer, which stores and processes the information.

The mass spectrometer includes electrical control circuitry and an imbedded CPU controller. The controller is connected to a local control interface (LCI) located on the outside of the mass spectrometer housing. The LCI includes push buttons and a display screen. This enables the user to input information into the mass spectrometer and to perform essential control functions. These functions include: checking the status of the instrument changing set points, starting of a method or sequence and the running of the system diagnostics. The mass spectrometer is connected to a personal computer or to a remote computer system by a local area network (LAN) for method development and data analysis. The LCI does not have the capacity for complete operation of the mass spectrometer. The display screen is small and difficult to use. The limited number of buttons and computing capacity makes it impossible for full control of the MS, including the keying in of a password. The capacity of the local control panel does not match the capacity of the imbedded controller. The LCI cannot display spectral information such as a histogram of collected peaks. The LCI cannot be used for post-processing of completed runs and sequences.

These and other difficulties with current LCI's for mass spectrometers have been obviated by the present invention.

What is needed, is a mass spectrometer that has a more flexible and versatile interface system. There is also a need for an interface system that is not necessarily limited in control capacity and which can be locked and unlocked. A still further need is an interface system that can be used for controlling a plurality of mass spectrometers.

BRIEF SUMMARY OF THE INVENTION

The invention is a mass spectrometer that includes a tray on the outer housing of the mass spectrometer for receiving a portable user interface. Each of the user interface and the tray has a transceiver port for transmitting and receiving electromagnetic wave radiation, preferably infrared radiation. More specifically, the tray also includes a serial port connector and the portable user interface includes a receptor for receiving the serial port connector when the user interface is mounted on the tray.

BRIEF DESCRIPTION OF THE DRAWINGS

The character of the invention, however, may be best understood by reference to one of its embodiments, as illustrated by the accompanying drawings, in which.

DETAILED DESCRIPTION OF THE INVENTION

Figure 1:
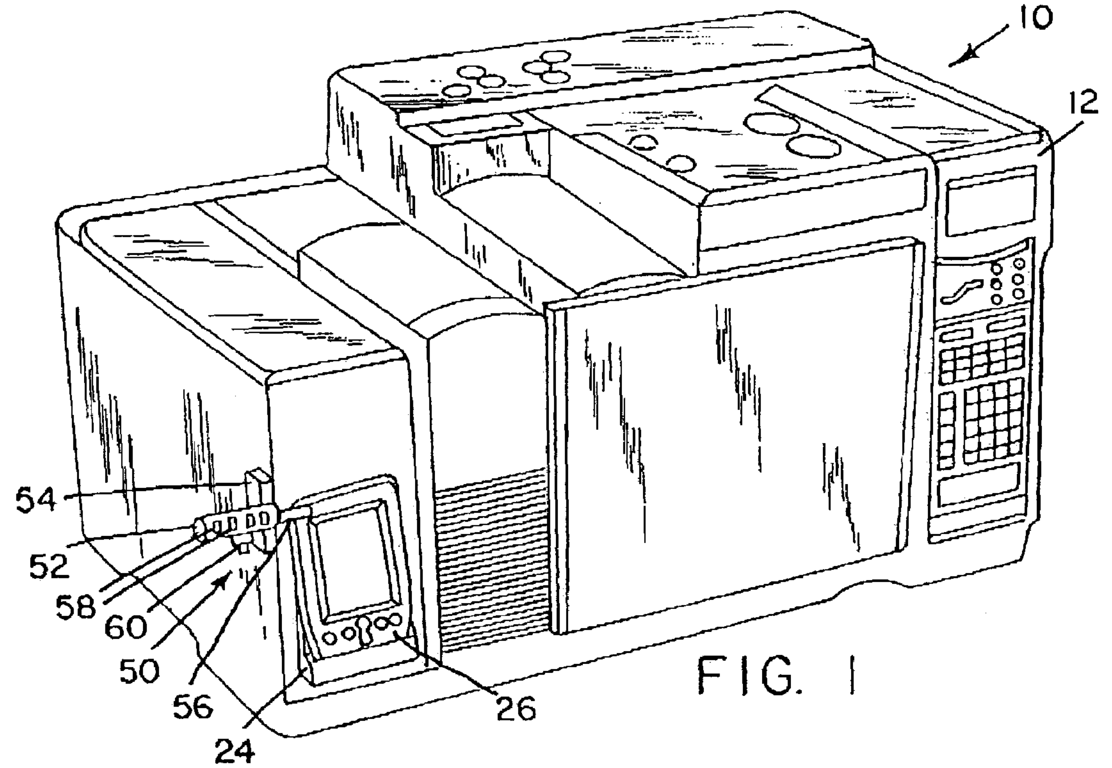
FIG. 1 is an isometric view of a mass spectrometer embodying the principles of the present invention and showing the portable user interface mounted in the tray.
Figure 2:
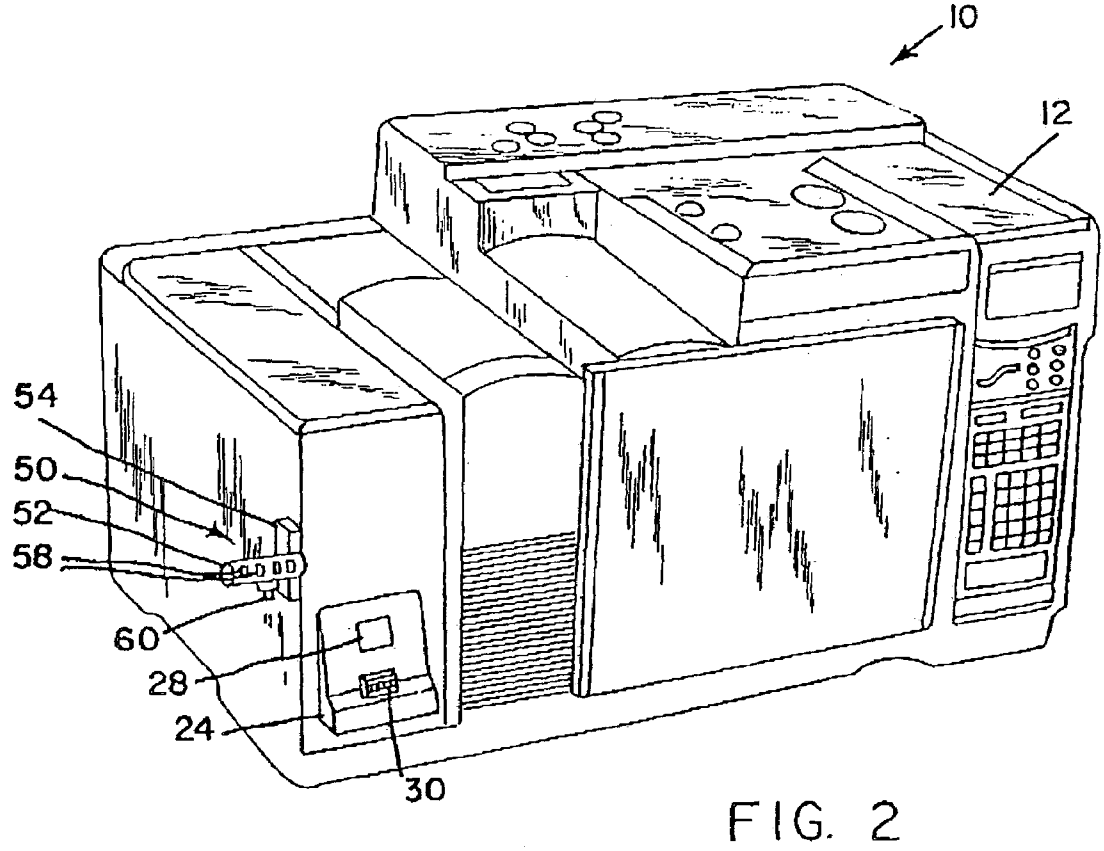
FIG. 2 is a view similar to FIG. 1 showing the tray without the portable user interface.

Referring first to FIGS. 1 and 2, there is shown a mass spectrometer embodying the principles of the present invention and generally indicated by the reference numeral 10. The mass spectrometer 10 includes a housing 12 which contains elements of the mass spectrometer such as ionization source, ion separation means and a detector. All of these elements are connected to internal electronics and imbedded programmable control hardware. A tray or cradle 24 is located at the front of the housing 12 for supporting a portable user interface 26.

The tray 24 has a first transceiver port 28 for transmitting and receiving electromagnetic wave radiation and a serial port connector 30.

Figure 3:
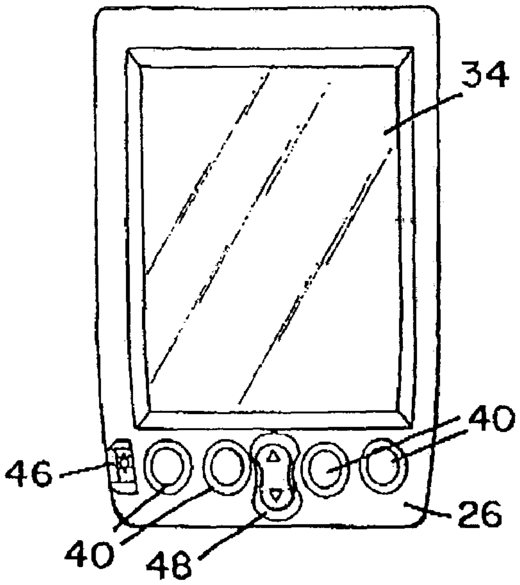
FIG. 3 is a front elevational view of the portable user interface.
Figure 4:
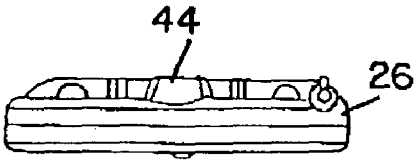
FIG. 4 is a top lan view of the portable user interface.
Figure 5:
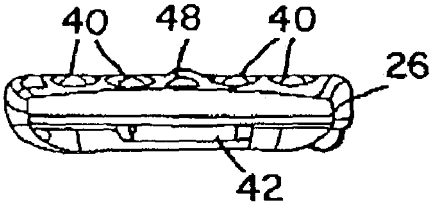
FIG. 5 is a bottom plan view of the portable user interfaces.

Referring to FIGS. 3–5, the portable interface 26 includes a display screen 34, application buttons 40, a power button 46 and a scroll button 48. A second transceiver 44 is located at the upper end of the portable interface 26 for transmitting and receiving electromagnetic wave radiation. In the example shown in the drawings, first and second transceivers 28 and 44, respectively, are adapted for transmitting and receiving infrared radiation. A serial port connector 42 is located at the lower end of the interface 26 for receiving the serial port connector when the portable interface 26 is inserted into the tray 24 as shown in FIG. 1.

The mass spectrometer 10, which by way of examples is a modified Agilent Technologies, Inc. Model 5973N is a commercially available portable interface equipped with an infrared transceiver and serial port receptor. Examples of such interfaces are PALM IIIc, PALM 100, PALM VIIx. Other brand models could also be used. The transceiver port 28 and serial port connector are both connected to the imbedded control circuitry which by way of example is a circuit board in the Agilent model 5973N known as the "SMART CARD".

The connection from the "SMART CARD" circuit board also provides power to the serial port connector 30 to maintain the portable user interface 26 charged when the interface 26 is mounted in the tray 24.

The current Agilent model 5973N can be retrofitted by removing the local control interface which exposes the USB serial connector to the ram circuit board. The USB serial connector is connected to an adapter. The adapter has outlet connections suitable for being connected to the tray 24 that normally corresponds to whatever portable user interface 26 being utilized with the invention. The adapter provides a connection to the serial port connector 30 and infrared port 28 of the tray 24. In most commercially available portable interface units, the infrared port is automatically disabled when the serial port connector 30 of the tray is connected to the serial port receptor 42 of user interface 26. In addition, the infrared port 28 cannot be accessed by the infrared transmitter 44 when the user interface 26 is located in the tray 24. Still further, the infrared port 28 of the present invention is preferably located on the tray 24 so that it cannot be accessed by the infrared transmitter of another user interface.

As shown in FIGS. 1 and 2, the user interface 26 is secured to the tray 24 by a mechanical lock, generally indicated by the reference numeral 50. The lock 50 has a housing 52 is fixed to the housing 12 by a bracket 54. A plunger 56 is slidable axially in the housing 34 between a withdrawn unlocked position shown in FIG. 2 to an extended locking position shown in FIG. 1. The lock 50 is a combination lock that includes four independent wheels 58 and a release button 60. The lock 50 functions in the same manner as the combination locks normally used for lap top computers. However, any locking device can be used with the invention.

The function of the mass spectrometer 10 is secured by entering a password from the user interface 26. Also, a single user interface 26 can be used to control several mass spectrometers equipped with compatible trays 24. For application of the mass spectrometer, the portable user interface 26 has sufficient control capacity to control the operation of the mass spectrometer. However, the portable user interface 26 can also be used in conjunction with an outside computer system connected directly to the mass spectrometer or at a remote location with local area network (LAN).

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired by Letters Patent of the United States is:

1. A mass spectrometer comprising:

(a) a housing;

(b) a tray located on said housing;

(c) a first transceiver port located on one of said tray and said housing for receiving and transmitting electromagnetic wave radiation; and (d) a portable user interface removably mounted on said tray, said user interface having a second transceiver port for transmitting said electromagnetic wave radiation to said first transceiver port and for receiving said electromagnetic wave radiation from said first transceiver port when said interface is removed from said tray, said portable user interface including a processor that is programmed to present a user interface for the mass spectrometer.

2. The mass spectrometer as recited in claim 1, wherein said electromagnetic wave radiation is infrared radiation.

3. The mass spectrometer as recited in claim 1, wherein said tray also comprises a serial port connector and said portable user interface includes a receptor for receiving said serial port connector when said user interface is mounted on said tray.

4. The mass spectrometer as recited in claim 1, further comprising a lock mounted on said tray for releasably locking said interface to said tray.

5. The mass spectrometer as recited in claim 4, wherein said lock comprises:

(a) a housing fixed to said tray;

(b) a plunger slidably mounted on said housing for movement between an extended position over said interface blocking removal of said portable interface and a retracted position for permitting removal of said portable interface from said tray; and (c) a combination number lock connected to said housing for releasably maintaining said plunger fixed in said extended position.

6. The mass spectrometer as recited in claim 3, wherein said housing contains operating electronic circuitry adapted to be connected to said first transceiver port when said portable user interface is removed from said tray and connected to said receptor when said portable user interface is mounted on said tray.

7. The mass spectrometer as recited in claim 3, wherein said mass spectrometer is adapted to operably disconnect said first transceiver port from said operating electronic circuitry when said serial port connector is connected to said receptor.

8. A mass spectrometer comprising:

(a) a housing;

(b) a tray located on the housing for receiving a portable user interface having an infrared transceiver for transmitting and receiving electromagnetic wave radiation and a serial port receptor, said portable user interface including a processor that is programmed to present a user interface for the mass spectrometer;

(c) a transceiver port on the tray for transmitting and receiving electromagnetic wave radiation; and (d) a serial port connector on said tray for connecting to the serial port receptor of said portable user interface.

9. The mass spectrometer as recited in claim 8, wherein said electromagnetic wave radiation is infrared radiation.

10. The mass spectrometer as recited in claim 8, further comprising a lock mounted on said tray for releasably locking said portable user interface to said tray.

11. The mass spectrometer as recited in claim 10, wherein said lock comprises:

(a) a housing fixed to said tray;

(b) a plunger slidably mounted on said housing for movement between an extended position over said interface blocking removal of said portable user interface and a retracted position permitting removal of said portable user interface from said tray; and (c) a combination number lock connected to said housing for releasably maintaining said plunger fixed in said extended position.

12. The mass spectrometer as recited in claim 8, wherein said housing contains operating electronic circuitry adapted to be connected to the first transceiver port on said tray when said portable user interface is removed from said tray and connected to the receptor of said portable user interface when said portable user interface is mounted on said tray.

13. The mass spectrometer as recited in claim 8, wherein said mass spectrometer is adapted to operably disconnect the transceiver port on said tray from said operating electronic circuitry when said serial port connector is connected to the serial port receptor of said portable user interface.

* * * * *